(12) United States Patent
Helsloot et al.

(10) Patent No.: US 8,964,967 B2
(45) Date of Patent: Feb. 24, 2015

(54) SUBBAND DOMAIN ECHO MASKING FOR IMPROVED DUPLEXITY OF SPECTRAL DOMAIN ECHO SUPPRESSORS

(71) Applicant: Dialog Semiconductor B.V., 's-Hertogenbosch (NL)

(72) Inventors: Michiel Helsloot, 's-Hertogenbosch (NL); Gavin Radolan, Cocoa Beach, FL (US)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 82 days.

(21) Appl. No.: 13/708,179

(22) Filed: Dec. 7, 2012

(65) Prior Publication Data

US 2014/0162731 A1    Jun. 12, 2014

(51) Int. Cl.
  *H04M 9/08* (2006.01)
  *H04B 3/20* (2006.01)
  *H04B 15/00* (2006.01)

(52) U.S. Cl.
  CPC ............... *H04B 15/00* (2013.01); *H04M 9/082* (2013.01)
  USPC ...................... 379/406.14; 370/289; 381/94.3

(58) Field of Classification Search
  USPC ......................................................... 370/289
  See application file for complete search history.

(56) References Cited

U.S. PATENT DOCUMENTS

| | | | |
|---|---|---|---|
| 6,597,787 B1 * | 7/2003 | Lindgren et al. ......... | 379/406.05 |
| 7,711,107 B1 * | 5/2010 | Murgia et al. ............. | 379/406.05 |
| 2007/0255560 A1 * | 11/2007 | Rahbar .......................... | 704/226 |
| 2009/0238373 A1 * | 9/2009 | Klein .............................. | 381/66 |

* cited by examiner

*Primary Examiner* — Simon Sing
*Assistant Examiner* — Jeffrey Lytle
(74) *Attorney, Agent, or Firm* — Saile Ackerman LLC; Stephen B. Ackerman

(57) ABSTRACT

A method and system for improving a perceived duplexity of handsfree telephone applications is disclosed. An echo suppression circuit for a device comprising loudspeaker and microphone is described. A circuit attenuates a subband of a transmit signal, wherein the transmit signal is captured by the microphone and wherein the transmit signal comprises an echo of a far-end signal rendered by the loudspeaker and a near-end signal. The attenuation circuit further determines a subband far-end indicator of a voice activity in the far-end signal; determines a subband near-end indicator of a voice activity of the near-end signal; determines a subband masking weight; determines a subband attenuation for the transmit signal in the subband; and attenuates the subband of the transmit signal using the determined subband attenuation.

29 Claims, 4 Drawing Sheets

SUBBAND DOMAIN ECHO MASKING FOR IMPROVED DUPLEXITY OF SPECTRAL DOMAIN ECHO SUPPRESSORS

TECHNICAL FIELD

The present document relates to echo cancellation and/or echo suppression. In particular, the present document relates to a method and system for improving the perceived duplexity of handsfree telephone applications.

BACKGROUND

Electronic devices such as cordless and/or wireless telephones are often used in a handsfree mode where an audio signal received from the far-end (referred to as the receive signal or the far-end signal) is rendered by a loudspeaker of the electronic device. An echo of the rendered far-end signal may be captured together with an audio signal from the near-end (referred to as the near-end signal) by a microphone of the electronic device, thereby yielding the transmit signal which is to be transmitted to the sender of the far-end signal. As such, the transmit signal may comprise an echo of the far-end signal which may lead to annoying artefacts for the sender of the far-end signal.

Typical electronic devices comprise echo suppression units or echo suppression circuits for removing the echo from the transmit signal. These echo suppression circuits typically attenuate the transmit signal depending on the received far-end signal. As a result, the transmit signal may be strongly attenuated in the case of a strong far-end signal (e.g. when the far-end signal is comprised of high speech activity), thereby leading to a reduction of duplexity (i.e. a reduction of the capability of an undisturbed two-way (listening and talking) voice communication).

The present document addresses the above mentioned short-coming of echo suppression circuits and describes a method and a system for increasing duplexity, while at the same time keeping the artefacts caused by the echo low.

SUMMARY

According to an aspect, an echo suppression circuit for an electronic device (e.g. comprising a cordless telephone function or a wireless telephone function) is described. The electronic device comprises a loudspeaker for rendering a receive signal received from a corresponding device at the far-end of a communication network. The receive signal may comprise a voice (or speech) signal originating from a user of the corresponding device at the far-end of the communication network. Furthermore, the electronic device comprises a microphone for capturing the transmit signal which is to be transmitted to the corresponding device at the far-end of the communication network. The transmit signal typically comprises an echo of the rendered receive signal (also referred to as the rendered far-end signal). Furthermore, the transmit signal may comprise a near-end signal, wherein the near-end signal typically originates from a user of the electronic device. By way of example, the near-end signal may comprise a voice (or speech) signal originating from the user of the electronic device.

The echo suppression circuit is configured to attenuate one or more subbands (e.g. spectral subbands) of the transmit signal (or subbands of a signal derived from the transmit signal). The amount of attenuation may be proportional to the content of far-end signal (e.g. echo) in the particular subband, and typically differs per subband. In particular, the echo suppression circuit is configured to determine a subband masking weight, wherein the subband masking weight is indicative of a masking of the echo of the far-end signal by the near-end signal in the subband. The attenuation applied by the echo suppression circuit onto the subband of the transmit signal may depend on the subband masking weight. In particular, the subband masking weight may be determined such that the attenuation applied to the subband of the transmit signal increases, if the masking of the echo of the far-end signal by the near-end signal in the subband decreases and/or vice versa. As such, the subband masking weight may influence the degree of attenuation applied by the echo suppression circuit, as a function of the masking of the echo in the transmit signal by the near-end signal.

For determining the subband masking weight, the echo suppression circuit may be configured to determine a subband far-end indicator of a voice (or speech) activity in the far-end signal. The subband far-end indicator may be determined based on the far-end signal in the subband. In an embodiment, the subband far-end indicator is determined solely based on the far-end signal in the subband. By way of example, the subband far-end indicator may correspond to or may comprise an estimate of a level of a voice signal comprised within the far-end signal. Alternatively or in addition, the subband far-end indicator may correspond to or may comprise a speech likelihood of the far-end signal (i.e. an indication of the likelihood that the far-end signal comprises a speech signal).

In a similar manner, the echo suppression circuit may be configured to determine a subband near-end indicator of a voice (or speech) activity of the near-end signal. The subband near-end indicator may be determined based on the far-end signal and based on the transmit signal in the subband. In an embodiment, the subband near-end indicator is determined solely based on the far-end signal and the transmit signal in the subband. By way of example, the subband near-end indicator may correspond to or may comprise an estimate of a level of a voice signal comprised within the near-end signal. Alternatively or in addition, the subband near-end indicator may correspond to or may comprise a speech likelihood of the near-end signal (i.e. an indication of the likelihood that the near-end signal comprises a speech signal).

The echo suppression circuit may then be configured to determine the subband masking weight, based on the subband far-end indicator and based on the subband near-end indicator. In particular, the echo suppression circuit may be configured to determine the subband masking weight based on a ratio of the subband far-end indicator and the subband near-end indicator. Furthermore, the subband masking weight may be determined based on a correction factor adapted to tune an influence of the masking of the echo of the far-end signal by the near-end signal on the subband attenuation.

In addition, the echo suppression circuit may be configured to determine a subband attenuation for the transmit signal in the subband. The subband attenuation may be determined based on the subband masking weight. As such, the subband attenuation may depend on the masking of the echo in the transmit signal by the near-end signal. Furthermore, the subband attenuation may be determined based on an estimate of a level of the echo of the far-end signal in the subband. The estimate of the level of the echo of the far-end signal in the subband may correspond to a level of the far-end signal in the subband multiplied by the subband echo path filter coefficient, wherein the subband echo path filter coefficient may be determined based on a correlation between the transmit signal and the far-end signal in the subband.

Subsequent to determining the subband attenuation, the echo suppression circuit may be configured to attenuate the subband of the transmit signal using the determined subband attenuation. It should be noted that the determined subband attenuation may be time-variant and/or frequency-variant. As such, different subbands of the transmit signal may be attenuated differently. In a similar manner, different temporal excerpts (e.g. different samples) of the subbands of the transmit signal may be attenuated differently.

As indicated above, the echo suppression circuit may be configured to operate on a plurality of subbands of the transmit signal. In particular, the echo suppression circuit may be configured to determine a plurality of subband masking weights and configured to determine a plurality of subband attenuations for attenuating the plurality of different subbands of the transmit signal. In an embodiment, the echo suppression circuit is configured to determine a plurality of subband far-end indicators based on a corresponding plurality of subbands of the far-end signal. In a similar manner, the echo suppression circuit may be configured to determine a plurality of subband near-end indicators based on a corresponding plurality of subbands of the far-end signal and based on a corresponding plurality of subbands of the transmit signal. Using this information, the echo suppression circuit may determine the plurality of subband masking weights, based on the plurality of subband far-end indicators and based on the plurality of subband near-end indicators. Furthermore, the echo suppression circuit may determine the plurality of subband attenuations for the transmit signal in the plurality of subbands, based on a respective plurality of estimates of the level of the echo of the respective plurality of subbands of the far-end signal and/or based on the respective plurality of subband masking weights. In addition, the echo suppression circuit may attenuate the plurality of subbands of the transmit signal using the respective plurality of determined subband attenuations, thereby attenuating the different subbands differently.

The echo suppression circuit may comprise a Time-to-Frequency Transform unit configured to determine a plurality of frequency components of the far-end signal and of the transmit signal, respectively. For this purpose, the Time-to-Frequency Transform unit may make use of a Time-to-Frequency Transform such as a Fast Fourier Transform. Furthermore, the echo suppression unit may comprise a Frequency-to-Subband unit configured to determine the reduced plurality of subbands of the far-end signal and of the transmit signal from the plurality of frequency components of the far-end signal and of the transmit signal, respectively. By way of example a plurality of frequency components may be combined to a subband, in order to reduce the computational complexity of the echo suppression circuit. The echo suppression circuit may be configured to determine a plurality of attenuations for the plurality of frequency components of the transmit signal by interpolating the plurality of subband attenuations. In other words, the individual attenuations for the individual frequency components may be determined by interpolating the subband attenuations which are determined for the respective subbands. The interpolation leads to a smoothing of the applied attenuation, thereby avoiding artifacts which might be caused by applying different subband attenuations to the different subbands of the transmit signal. The echo suppression circuit may further comprise an inverse Time-to-Frequency Transform unit configured to determine an echo suppressed transmit signal from the plurality of attenuated subbands of the transmit signal. In particular, the echo suppressed transmit signal may be determined from the plurality of attenuated frequency components of the transmit signal.

As indicated above, the echo suppression circuit may be configured to determine a subband echo path filter coefficient based on a correlation between the transmit signal and the far-end signal in the subband. The subband echo path filter coefficient may be indicative of the echo path from the loudspeaker of the electronic device to the microphone of the electronic device. In particular, the subband echo path filter coefficient may be indicative of how much energy of the rendered far-end signal is coupled into the transmit signal as an echo. In such cases, the estimate of the level of the echo of the far-end signal in the subband may correspond to a level of the far-end signal in the subband multiplied by the subband echo path filter coefficient. Furthermore, the echo suppression circuit may be configured to determine the subband attenuation by weighting the subband echo gain filter with the subband masking weight.

It should be noted that "levels" of signals in the present document may be determined based on (averaged) squared samples of the signal or based on a subband energy.

According to another aspect, an electronic device (e.g. comprising a telephone application) is described. The electronic device comprises a loudspeaker adapted to render a far-end signal received at the electronic device. Furthermore, the electronic device comprises a microphone adapted to capture a transmit signal, wherein the transmit signal may comprise an echo of the rendered far-end signal and a near-end signal. In addition, the electronic device comprises an echo suppression circuit adapted to attenuate a subband of a signal derived from the transmit signal, thereby yielding an echo suppressed transmit signal. The echo suppression circuit may be configured as described in the present document. A transmission unit comprised within the electronic device may be used to transmit the echo suppressed transmit signal to a sender of the far-end signal.

The electronic device may further comprise an echo cancellation unit adapted to determine an estimate of the echo of the rendered far-end signal, based on the received far-end signal. In addition, the echo cancellation unit may be adapted to subtract the estimate of the echo of the rendered far-end signal from the transmit signal, thereby yielding the signal derived from the transmit signal.

According to another aspect, a method for attenuating a subband of a transmit signal is described. The method comprises capturing the transmit signal using a microphone, wherein the transmit signal comprises an echo of a far-end signal rendered by a loudspeaker, and a near-end signal. The method may comprise determining a subband far-end indicator of a voice activity in the far-end signal based on the far-end signal in the subband. Furthermore, the method may comprise determining a subband near-end indicator of a voice activity of the near-end signal, based on the far-end signal and based on the transmit signal in the subband. The method may then proceed in determining a subband masking weight, based on the subband far-end indicator and based on the subband near-end indicator. The subband masking weight may be indicative of a masking in the subband of the echo of the far-end signal by the near-end signal. In addition, the method may comprise determining a subband attenuation for the transmit signal in the subband based on an estimate of a level of the echo of the far-end signal in the subband and based on the subband masking weight. The method may then proceed with attenuating the subband of the transmit signal using the determined subband attenuation.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 illustrates an example electronic device;

DETAILED DESCRIPTION

Figure 1:
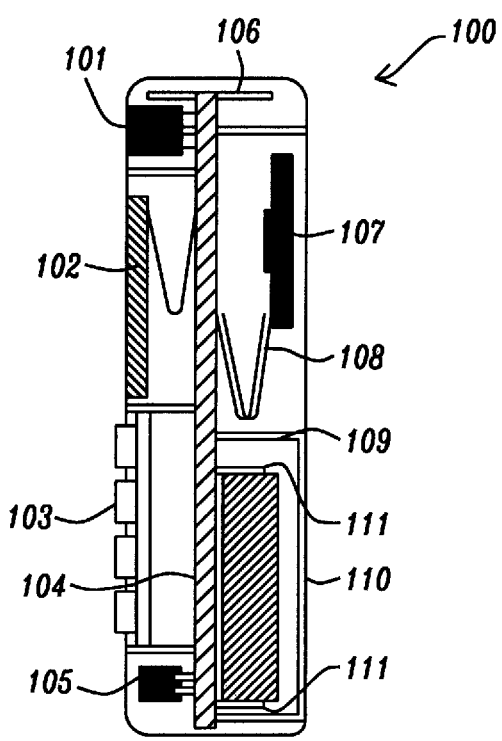

FIG. 1 illustrates an example device 100 with which (and in particular within which) the systems and methods described in the present document may be used. The example device 100 comprises a transducer 107 (in the present example a loudspeaker) which is surrounded by a cabinet (also referred to as an enclosure, casing or housing). The transducer 107 may be used to render a receive signal (e.g. a signal received from a remote calling party) when the device 100 is operated in a handsfree mode. The receive signal may also be referred to as the far-end signal. The example electronic device 100 may be a cordless handset or a wireless telephone. The device 100 may further comprise an earpiece 101 which may be the transducer for rendering the receive signal directly to the ear of a user of the device 100.

In addition, the device 100 typically comprises a microphone 105 for generating a transmit signal (e.g. to be transmitted from the device 100 to the remote calling party). When operated in the handsfree mode, the microphone 105 may not only capture an acoustic signal generated at the electronic device 100 (e.g. by the user), the microphone 105 may also capture an echo of the far-end signal rendered by the transducer 107. As such, the transmit signal may comprise a near-end signal which is generated at the electronic device 100 (e.g. by the user) and an echo of the far-end signal which is due to an echo path from the transducer 107 to the microphone 105 of the device 100.

Further components of the electronic device 100 may be a display 102, one or more keys of a keyboard 103, a PCB (Printed Circuit Board) 104, PCB retaining clips 109, Battery clips 111, a battery cover 110, a battery, leads and/or wires 108, and antennas 106. Overall, the electronic device 100 may be subject to various mechanical and acoustic resonances/distortions when rendering the receive signal. The resonances/distortions may be caused by the different components of the device 100, and/or by acoustic chambers formed by the different components.

Figure 2A:
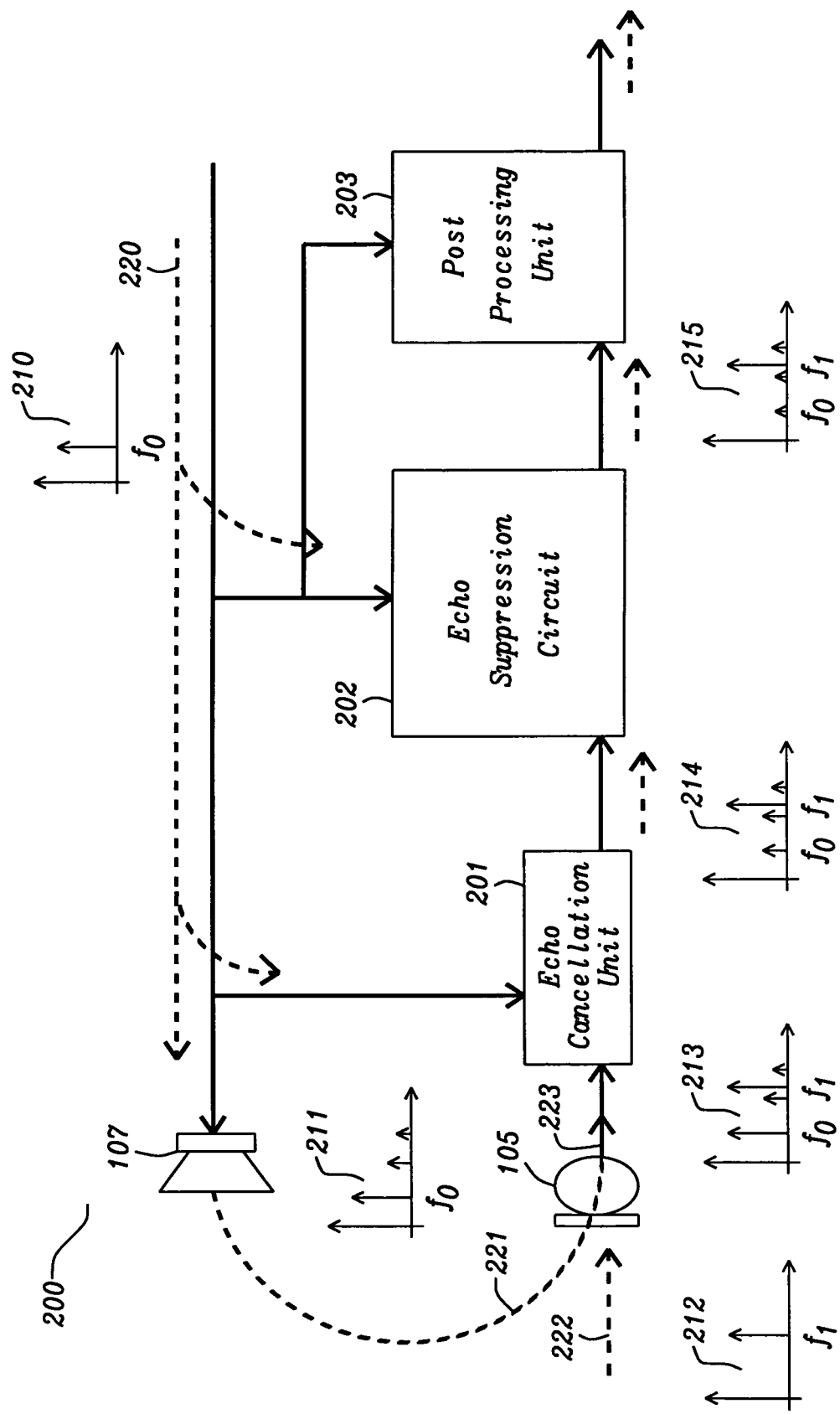
FIG. 2a shows example signal processing for reducing the echo on a transmit path of an electronic device in handsfree mode.

FIG. 2a illustrates example signal processing 200 which may be performed within the example device 100 of FIG. 1. Furthermore, an example spectrum 210 of a receive audio signal 320 comprising a single tone (or single sinusoid) at frequency $f_0$ is illustrated. The receive signal 220 (also referred to as the far-end signal 220) is received at the electronic device 100 (e.g. via the antenna 106). The far-end signal 220 may be submitted to signal processing (not illustrated) on the receive path between the antenna 106 and the transducer 107, e.g. Automatic Gain Control (AGC) for limiting a level of the rendered far-end signal 220, volume control for adjusting a level of the rendered far-end signal 220 and/or equalization for modifying a spectral envelope of the rendered far-end signal 220.

Subsequent to the optional processing on the receive path, the far-end audio signal 220 is rendered by the transducer 107 of the electronic device 100 which results in a frequency spectrum 211 of the rendered far-end audio signal 221. The rendered far-end signal 221 may be distorted (due to resonances caused at the electronic device 100). This is illustrated by the harmonic frequencies of frequency $f_0$ comprised within the frequency spectrum 211.

The rendered far-end signal 221 may be captured by the internal microphone 105 of the electronic device 100 as an echo. Furthermore, the microphone 105 may capture a near-end signal 222. In the illustrated example, the spectrum 212 of the near-end signal 222 comprises a single tone (or single sinusoid) at frequency $f_1$. As such, the overall transmit signal 223 captured by the microphone 105 comprises a captured echo of the rendered far-end signal 221 and the captured version of the near-end signal 222. The spectrum 213 of the transmit signal 223 comprises frequency components of the near-end signal 222 (at frequency $f_1$), frequency components of the far-end signal 220 (at frequency $f_0$).

The processing 200 may comprise an echo cancellation (e.g. within an echo cancellation unit 201) which is configured to estimate the echo of the far-end signal 210 comprised within the transmit signal 223. Example echo cancellation units 201 make use of one or more of the following estimation algorithms: LMS (Least Mean Square), nLMS (normalized LMS), IPnLMS (Improved Proportionate normalized Least-Mean-Square), APA (Affine Projection Algorithm), RLS (Recursive Least Square). The estimation algorithm may be used to estimate the echo of the far-end signal 210 based on the far-end signal 210. The echo cancellation unit 201 is typically configured to (partly) cancel the frequency components of the far-end signal 220 (at frequency $f_0$) comprised within the transmit signal 223 by subtracting the echo estimate from the transmit signal 223, thereby yielding an echo compensated transmit signal 223. The spectrum 214 of the echo compensated transmit signal 223 is shown in FIG. 2a. It can be seen that the energy of the frequency component at $f_0$ is reduced as a result of the echo compensation performed in unit 201.

However, the echo cancellation unit 201 is typically only able to (partly) cancel the fundamental frequency $f_0$ of the distorted spectrum 211 of the rendered far-end signal 221, since the fundamental frequency $f_0$ is the only frequency present in the 'reference' input 220 (i.e. in the receive audio signal) of the echo cancellation unit 201. In other words, the echo cancellation unit 201 is typically only able to cancel the frequency components already comprised within the far-end signal 220. Hence, after cancelling the ground harmonic at frequency $f_0$ (i.e. after cancelling the frequency components comprised within the far-end signal 220), the output signal of the echo cancellation unit 201 typically comprises the distortion components of the echo signal (illustrated by the echo cancelled spectrum 214) as well as the frequency components of the near-end signal 222. Furthermore, the output signal of the echo cancellation unit 201 may still comprise a residual of the frequency components comprised within the far-end signal 220.

The signal processing may comprise a spectral-domain echo suppression unit 202. Typically, the spectral-domain echo suppression unit 202 considers the energy in the 'reference' signal 220 (i.e. in the far-end audio signal) after dividing the 'reference' signal 220 into L spectral subbands (L being an integer greater than one). For each subband the suppressor 202 estimates the echo energy and subtracts the estimated echo energy within the subband from the transmit signal 223 (e.g. from the transmit signal 223 subsequent to the echo cancellation unit 201). This is typically achieved by the application of an attenuation factor proportional to the amount of echo content in each subband. When a subband contains both echo and near-end speech it is attenuated due to the echo, which leads to reduced duplexity.

In more detail, the spectral-domain echo suppression unit 202 (also referred to as the Spectral Subtraction Echo Suppressor 202) may make use of an algorithm which predicts the echo energy from the available spectral and temporal properties of the far-end signal 220. The prediction of the echo energy is typically based on an (adaptive) estimation of the coupling between the speaker 107 and the microphone 105. The spectral-domain echo suppression unit 202 subtracts the estimated echo energy from the transmit signal 223, thereby yielding an echo suppressed transmit signal 223.

Figure 2B:
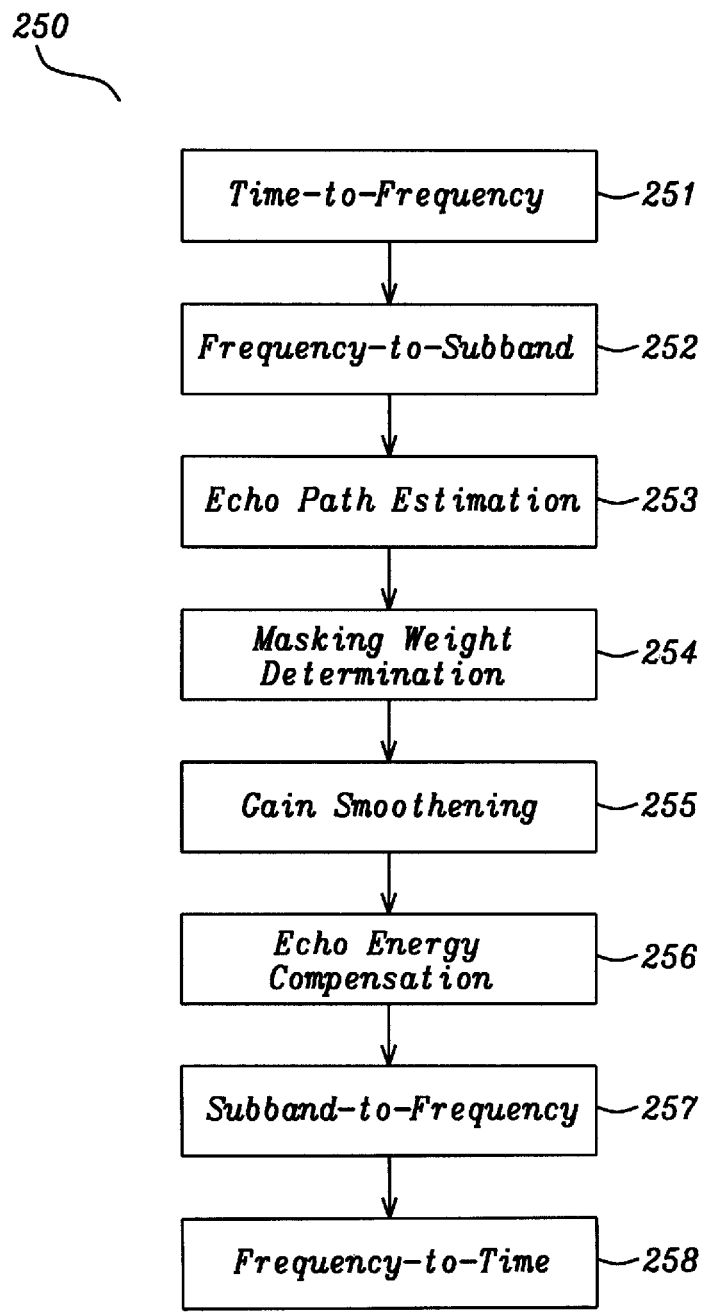
FIG. 2b illustrates a flow chart of an example method for suppressing an echo on the transmit path of an electronic device.

An example method 250 for echo suppression performed within the spectral-domain echo suppression unit 202 is illustrated in FIG. 2b. In step 251, the transmit signal t(n) 223 (or an echo compensated version thereof) and the far-end signal r(n) 220 are converted from the time-domain into the frequency-domain using a Time-to-Frequency Transform (e.g. a Fast Fourier Transform), thereby yielding T(k,n) and R(k,n). In the above notation, n is a time or sample index and k=1, . . . , K is a frequency bin index (e.g. K=128). Subsequently, some of the frequency bins k may be combined, in order to form a reduced number L (e.g. L=12) of subbands R(l,n) and T(l,n), with l=1, . . . , L being the subband index (step 252). The combination of a plurality of frequency bins k into a subband may be performed in order to reduce the computational complexity of the echo suppressor 202. Aggregate power levels may be determined for each subband based on the sum of a plurality of frequency bins comprising the subband, e.g. R(l,n)=ΣR(k,n) and T(l,n)=ΣT(k,n).

In method step 253 the echo path properties are estimated for each of the subbands l=1, . . . , L. The echo path properties may describe a relationship between a subband R(l,n) of the far-end signal 220 and a corresponding subband T(l,n) of the transmit signal 223 (i.e. of the input signal to the echo suppressor 202) in the absence of a near-end signal 222. The echo path property of a subband l=1, . . . , L may be described e.g. by a filter H(l,n) such as a Finite Impulse Response (FIR) filter $$H(l, n) = \sum_{m=0}^{M-1} h_m(l, n) \cdot z^{n-m},$$

with $h_m(l,n)$ being the coefficients of the filter. It should be noted that a time-domain subband canceller may serve as an alternative implementation. In an embodiment, the echo path property of a subband l=1, . . . , L is described by a single gain coefficient $h_0(l,n)$, i.e. by an FIR filter with M=1 coefficients. In another example, M is greater than one. The echo path property of a subband l=1, . . . , L may be determined by considering the subband T(l,n) of the transmit signal 223 in the absence of a near-end signal 222 in conjunction with the corresponding subband R(l,n) of the far-end signal 220. A cross-correlation between R(l,n) and T(l,n), e.g. C(l,0)=ΣR(l,n)·T(l,n) across an observation window of a plurality of samples, may then provide an indication of the gain coefficient $h_0(l,n)$. In other words, the echo path properties, e.g. described by the echo path filter coefficient $h_0(l,n)$, may be determined based on the cross-correlation between R(l,n) and T(l,n).

The echo path properties of the subbands l=1, . . . , L may be used to determine an estimate of the echo energy within the respective subbands. In an embodiment, the echo path properties are described by a filter H(l,n) and an estimate of the echo energy E(l,n) comprised within a subband T(l,n) of the transmit signal 223 may be determined by filtering the subband R(l,n) of the far-end signal 220 using the filter H(l,n) describing the echo path properties. The estimated echo energy E(l,n) within a subband l may then be substracted from the subband T(l,n) of the transmit signal 223, and divided by T(l,n) to yield a subband echo gain filter, G(l,n). This subband echo gain filter G(l,n) can subsequently be applied during the final subband-to-frequency conversion, resulting in an echo suppressed transmit signal, to which an inverse frequency-to-time transformation (e.g. inverse Fourier Transform) can be applied. 223. The echo energy compensation is performed in method step 256.

It should be noted that the use of different echo path properties, e.g. the use of different filters H(l,n) or different gain coefficients $h_0(l,n)$, for different subbands may lead to discontinuities at the subband edges for the subband echo gain filter G(l,n). In view of this, it may be beneficial to smoothen the echo path properties, e.g. the filters H(l,n) or echo path filter coefficients $h_0(l,n)$. The smoothening may be performed in an optional method step 255. In an embodiment, the smoothening comprises the determination of different echo path properties for the different frequency bins k=1, . . . , K from the echo path properties for the different subbands l=1, . . . , L. The echo path properties for the different frequency bins k=1, . . . , K may be determined by interpolating the echo path properties for the different subbands l=1, . . . , L, such that smooth transitions are obtained from one frequency bin to an adjacent frequency bin. By way of example, the echo path filter coefficients $h_0(l,n)$ for l=1, . . . , L may be interpolated to determine gain coefficients $h_0(k,n)$ for k=1, . . . , K.

The smoothened (e.g. interpolated) echo path properties (e.g. the echo path filter coefficients $h_0(k,n)$) may be applied to the subbands R(l,n) (or the frequency bins R(k,n)) of the far-end signal 220, thereby yielding an estimate of the echo energy E(l,n) within a subband l (or an estimate of the echo energy E(k,n) within a frequency bin k). The estimated echo energy E(l,n) within a subband l may then be subtracted from the subband T(l,n) of the transmit signal 223, and the difference may be divided by the subband T(l,n) of the transmit signal 223 to yield a subband echo gain filter G(l,n). As indicated above, the echo energy compensation is performed in method step 256. The subband echo gain filter G(l,n) may be applied to the subband T(l,n) of the transmit signal, thereby yielding an echo suppressed subband $\hat{T}(l,n)$ of the transmit signal. Using a subband to bin transform, the echo suppressed frequency bins $\hat{T}(k,n)$ may be determined (method step 257).

The echo suppressed frequency bins $\hat{T}(k,n)$ of the transmit signal 223 are converted back into the time domain (method step 258) using an inverse Time-to-Frequency Transform (e.g. an inverse Fast Fourier Transform). As a result, an echo suppressed version of the transmit signal 223 is obtained at the output of the spectral-domain echo suppression unit 202. It should be noted that the processing 200 may comprise further post processing (e.g. unit 203) and the processed transmit signal 223 may be encoded for transmission over a telecommunication network.

The echo suppression applied within the spectral-domain echo suppression unit 202 is typically such that all frequency components of the transmit signal 223 (even the frequency components which are due to the near-end signal 222) are attenuated. This leads to a reduction of the full duplexity of the electronic device 100, because the components of the near-end signal 222 within the transmit signal 223 may be attenuated such that the near-end signal 222 is not (or not sufficiently) audible by a user at the far-end. In view of the above, it is beneficial to modify the processing of the spectral-domain echo suppression unit 202 in order to improve the full duplexity of the electronic device 100 (in particular, when operated in handsfree mode).

In the present document, a method and system is described, wherein the method and system automatically reduce echo attenuation applied to the transmit path of the electronic device 100, whenever the echo energy is masked by the presence of a near-end signal 222. In other words, it is proposed to consider masking by the near-end signal 222 of an echo comprised within the transmit signal 223. If it is determined that an echo comprised within the transmit signal 223 is masked by the near-end signal 222, the echo attenuation applied within the spectral-domain echo suppression unit 202 may be reduced, thereby increasing duplexity. At the same time, the audible echo perceived within the transmit signal 223 remains small, due to the masking of the echo by the near-end signal 222.

The masking effect may be taken into account when performing echo suppression using an additional masking weight which is applied when determining the estimated echo E(l,n) within a subband l and at the time or sample index n. The masking weight may be determined in the context of step 254 of method 250 of FIG. 2b.

In an embodiment, a masking weight w(l,n) is determined for each of the subbands l=1, . . . , L. The masking weight w(l,n) may be a function of (e.g. a function of the ratio of) an indicator $a_{NE}(l,n)$ of the audio activity (e.g. a speech activity) of the near-end signal 222 and an indicator $a_{FE}(l,n)$ of the audio activity (e.g. a speech activity) of the far-end signal 222, i.e. w(l,n)=f($a_{NE}$=(l,n),$a_{FE}$(l,n)), wherein the operator f( ) represents an arbitrary function. Furthermore, the masking weight w(l,n) may be a function of a correction factor α which can be used to emphasize or limit the effect of the masking weight on the echo suppression. In other words, the correction factor α can be used to emphasize or limit the masking weight, thereby emphasizing or limiting the effect of the masking weight on the echo suppression.

As indicated above, the masking weight w(l,n) may be used to take into account masking effects, when determining the echo suppressed near-end signal. This may be done, e.g. by using the following equation for determining the subband echo gain filter:

$$G(l, n) = w(l, n) \cdot \left( \frac{T(l, n) - E(l, n)}{T(l, n)} \right).$$

The masking weight w(l,n) may be defined such that the masking weight w(l,n) increases with an increasing masking effect. In particular, the masking weight w(l,n) may take on a maximum value when the transmit signal fully masks the echo, and a minimum value when there is no masking. A masking weight w(l,n) less than 1 may be applied to the subband gain filter coefficients, G (l,n) (as indicated by the above mentioned equation), in order to reduce the estimated echo energy E(l,n) within a subband l. In particular, w(l,n) is applied to the echo gain filter coefficients, such that as the masking affect increases, w(l,n) increases and vice versa, as can be seen by the above mentioned equation for G(l,n).

It should be noted that other definitions of the masking weight w(l,n) are possible. By way of example, the subband echo gain filter may be determined using an alternative equation:

$$G(l, n) = \left( \frac{T(l, n) - w(l, n) \cdot E(l, n)}{T(l, n)} \right).$$

In such a case, the masking weight w(l,n) may be defined such that the masking weight w(l,n) decreases with an increasing masking effect. In general terms, the masking weight w(l,n) is configured to decrease the amount of attenuation of a subband l=1, . . . , L, of the transmit signal 223, if it is determined that the near-end signal 222 masks an echo of the far-end signal 220 comprised within the transmit signal 223. The amount of attenuation is decreased, as the masking effect increases.

The effect of applying masking weights when determining the estimated echo energy (and the corresponding echo suppression) can be illustrated using the spectra 214, 215 of the transmit signal 223 at the input and at the output of the echo suppression unit 202, respectively. The near-end signal 222 only comprises a frequency component at the frequency $f_1$, whereas the far-end signal 220 only comprises a frequency component at the frequency C. The frequencies $f_0$ and $f_1$ may be different from one another. The near-end signal 222 masks any echo components in the subband h comprising the frequency $f_1$. In other words, the near-end signal 222 masks echo components in a frequency range which is close to the frequency component at the frequency $f_1$ of the near-end signal 222. On the other hand, no masking occurs in other subbands. As such, the masking weight $w(l_1,n)$ of subband $l_1$ would be higher than the masking weight w(l,n) for the other subbands. This results in reduced attenuation for the subband $l_1$ comprising the frequency $f_1$ compared to the other subbands, thereby leading to a reduced attenuation for the near-end signal 222, i.e. thereby increasing the duplexity of the electronic device 100. This is illustrated by the spectrum 215 of the echo suppressed transmit signal 223, where the frequency component at frequency $f_1$ remains substantially un-attenuated, whereas the other frequency components (caused by the echo) are attenuated.

In other words, the far-end signal 220 may generate non-linear-harmonies within the echo signal. The near-end signal 222 comprising a frequency component at the frequency $f_1$ will mask harmonics within the echo signal that are in the same frequency band as frequency $f_1$. The methods described in the present document help relax the regular filters, the non-linear post filter and the mechanical post filter.

As indicated above, the masking weight $w(l,n)$ may be a function of an appropriate indicator $a_{NE}(l,n)$ of the audio activity of the near-end signal 222 and an appropriate indicator $a_{FE}(l,n)$ of the audio activity of the far-end signal 220, and possibly a correction factor $\alpha$. The indicators $a_{NE}(l,n)$ and/or $a_{FE}(l,n)$ may be determined based on an estimate of the energy level of an audio signal (e.g. a voice signal) comprised within the near-end signal (222) and/or an estimate of the energy level of an audio signal (e.g. a voice signal) comprised within the far-end signal (223). Alternatively or in addition, the indicators $a_{NE}(l,n)$ and/or $a_{FE}(l,n)$ may be determined based on an estimate of the speech likelihood of the near-end signal (222) and/or an estimate of the speech likelihood of the far-end signal (223). Various schemes for determining the energy level and/or the speech likelihood may be used. In the following an example scheme is described.

In an embodiment, the indicator $a_{FE}(l,n)$ is determined based on the far-end signal 220 on the receive path. A level of the background (stationary) noise comprised within the far-end signal 220 may be estimated e.g. using an averaging filter across a plurality of samples of the far-end signal 220. The estimated level of the background noise may be subtracted from the level of the far-end signal 220 on the receive path, thereby yielding an estimate of the level of a speech signal comprised within the far-end signal 220. It should be noted that the above mentioned operations may be performed for each subband $l=1, \ldots, L$, separately, thereby yielding L estimates of the level of a speech signal comprised within the L subbands of the far-end signal 220, respectively. The indicator $a_{FE}(l,n)$ may be determined based on (e.g. may be equal to) the estimate of the level of a speech signal comprised within the subband l of the far-end signal 220.

The indicator $a_{NE}(l,n)$ may determined based on the transmit signal 223 on the transmit path (e.g. based on the echo compensated transmit signal 223 at the input of the echo suppression unit 202). A level of the background (stationary) noise comprised within the transmit signal 223 may be estimated e.g. using an averaging filter across a plurality of samples of the transmit signal 223. The estimated level of the background noise may be subtracted from the level of the transmit signal 223 on the transmit path, thereby yielding an estimate of the level of a noise compensated transmit signal 223. Furthermore, an estimate of the level of the echo (due to the far-end signal 220) comprised within the transmit signal 223 may be determined based on a cross-correlation of the far-end signal 220 and the transmit signal 223, e.g. based on $C(l,0) = \Sigma R(l,n) \cdot T(l,n)$ across an observation window of a plurality of samples. The cross-correlation may then be subtracted from the noise compensated transmit signal 223 to yield an estimate of the level of a speech signal comprised within the near-end signal 222. It should be noted that the above mentioned operations may be performed for each subband $l=1, \ldots, L$, separately, thereby yielding L estimates of the level of a speech signal comprised within the L subbands of the near-end signal 222, respectively. The indicator $a_{NE}(l,n)$ may be determined based on (e.g. may be equal to) the estimate of the level of a speech signal comprised within the subband l of the near-end signal 222.

As indicated above, the masking weight may be determined as $w(l,n) = f(a_{NE}(l,n), a_{FE}(l,n), \alpha)$. Example functions for determining the masking weight are:

$$w(l,n) = \alpha \frac{a_{NE}(l,n)}{a_{FE}(l,n)}$$

$w(l,n) = \alpha * G(l,n)$, when $a_{NE}(l,n) > t_{NE}(l,n)$
$w(l,n) = 1$, otherwise In the first example $w(l,n)$ is continuous and proportional to the near-end masking affect, as indicated by $a(l,n)$.

In the second example, the near-end indicator is compared to a programmable near end threshold, $t_{NE}(l,n)$). When the near-end indicator exceeds the threshold $t_{NE}(l,n)$), weight $w(l,n)$ increases, thereby reducing the echo attenuation factor $G(l,n)$. Otherwise, the value of $w(l,n)$ is unity, resulting in no reduction to gain filter $G(l,n)$.

It should be noted that the masking weight may de determined using other functions, depending on how the masking weight is used to modify the degree of suppression (i.e. the degree of attenuation). By way of example, the masking weight may be determined as $$w(l,n) = \alpha \frac{a_{FE}(l,n)}{a_{NE}(l,n)}$$

such that a low masking weight indicates a strong masking effect and vice versa. As indicated above, the indicators $a_{NE}(l,n)$ and/or $a_{FE}(l,n)$ may be determined based on a speech likelihood and/or based on a level of the near-end signal 222 and the far-end signal 220, respectively.

The masking weight $w(l,n)$ may be applied to the subband echo gain filter coefficients, yielding modified gain filter coefficients $$G(l,n) = w(l,n) \cdot \frac{T(l,n) - E(l,n)}{T(l,n)},$$

for $l=1, \ldots, L$. As a result, the echo suppression unit 202 attenuates less energy when there is near-end speech that may be masking the actual echo energy. As indicated above, the implementation of the masking weight $w(l,n)$ may rely on a ratio between the speech activity of the near-end and far-end signals. Consequently, the effect of a reduced attenuation of energy may be stronger whenever the near-end speech activity is stronger than the far-end speech activity. And inversely, the weighing may be reduced automatically, if and when there is not enough near-end speech activity to mask the echo energy from the far-end signal.

It should be noted that gain smoothing (step 255) may be applied to the modified gain filter coefficients $G(l,n)$ in a similar manner as described above (e.g. by interpolating the modified gain coefficients $G(l,n)$), in order to yield modified gain coefficients for each frequency bin $k=1, \ldots, K$.

Figure 3A:
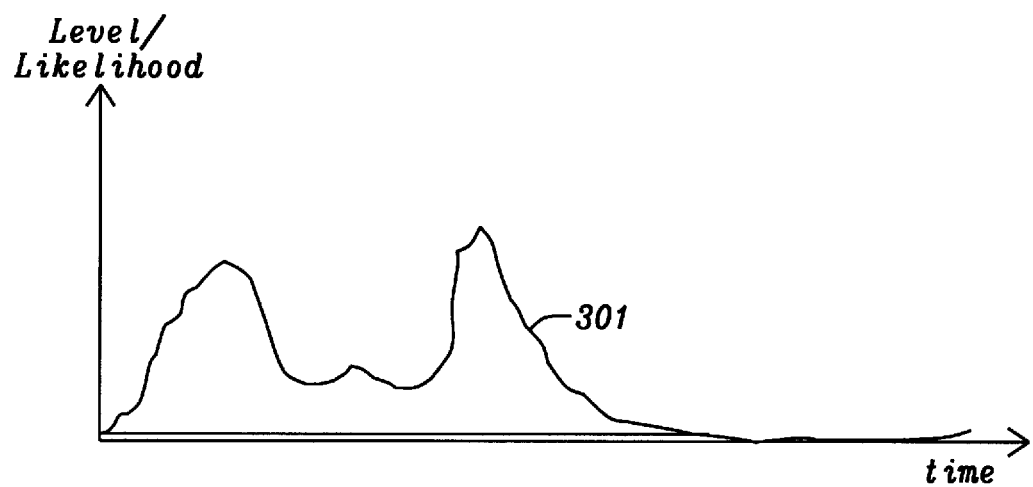
FIGS. 3a and 3b illustrate a scheme for increasing the duplexity of an electronic device in handsfree mode.
Figure 3B:
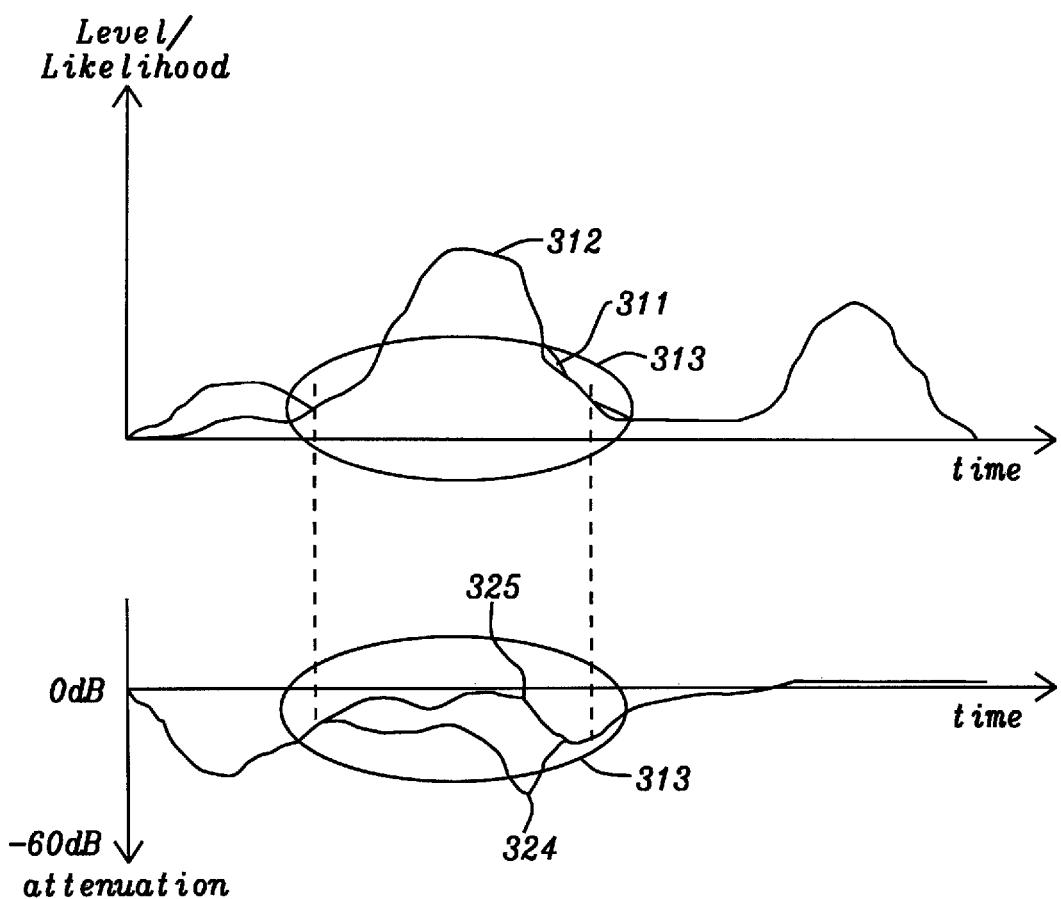

The masking effect and the reduced echo suppression are illustrated in FIGS. 3a and 3b. FIG. 3a shows the indicator $a_{FE}(l,n)$ 301 of the audio activity of an example far-end signal 220. In the illustrated example, the indicator $a_{FE}(l,n)$ 301 corresponds to a level of the speech or to a speech likelihood of the far-end signal 220. The indicator $a_{FE}(l,n)$ 301 of the audio activity of the example far-end signal 220 varies along the time line (i.e. along the sample index n).

There may be a (programmable) limit to the strength of the masking weight. By way of example, the masking weight may be such that it may not relax attenuation more than a pre-determined maximum amount.

FIG. 3b illustrates the indicator $a_{NE}(l,n)$ 312 of the audio activity of an example near-end signal 222. In the illustrated example, the indicator $a_{NE}(l,n)$ 312 corresponds to a level of the speech or to a speech likelihood of the near-end signal 222. The indicator $a_{NE}(l,n)$ 312 of the audio activity of the example near-end signal 222 varies along the time line (i.e. along the sample index n). Furthermore, FIG. 3b shows a corresponding indicator 311 of the audio activity of the echo of the far-end signal 220 comprised within the transmit signal 223. The corresponding indicator 311 is typically correlated with the indicator $a_{FE}(l,n)$ 301 of the audio activity of the example far-end signal 220 shown in FIG. 3a. It can be seen that within the time interval 313, the audio activity of the near-end signal 222 masks the audio activity of the echo in the transmit signal 223. This masking effect is reflected by the indicators $a_{FE}(l,n)$ 301 and $a_{NE}(l,n)$ 312, leading to a reduced echo suppression in the time interval 313, as illustrated by the curve 324 of the non-weighted echo gain filter coefficient and the curve 325 of the weighted echo gain filter coefficient $G(l,n)$.

The weighted echo gain filter coefficient $G(l,n)$ leads to reduced echo suppression, i.e. to a reduced attenuation of the transmit signal 223 during the time interval 313, thereby increasing the duplexity of the electronic device 100.

In the present document, a method and system for improving the duplexity of an electronic device operated in hands-free mode have been described. The described method and system exploit the masking of an echo comprised within a transmit signal by a near-end signal comprised within the transmit signal. For this purpose, a masking weight is determined which reduces the attenuation of a spectral domain echo suppressor (or a subband domain or time domain implementation) as a function of the degree of the masking effect. By reducing the attenuation in spectral bands with masking and/or during time periods with masking, the overall degree of attenuation can be reduced, without increasing the perceived artefacts caused by an echo comprised within the transmit signal. As a result, the duplexity of the electronic device is increased.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. An echo suppression circuit for an electronic device comprising a loudspeaker and a microphone; wherein an attenuation circuit is configured to attenuate a subband of a transmit signal; wherein the transmit signal is captured by the microphone; wherein the transmit signal comprises an echo of a far-end signal rendered by the loudspeaker and a near-end signal;

wherein the attenuation circuit is configured to determine a subband far-end indicator of a voice activity in the far-end signal based on the far-end signal in the subband;

determine a subband near-end indicator of a voice activity of the near-end signal based on the far-end signal and based on the transmit signal in the subband;

determine a subband masking weight, based on the subband far-end indicator and based on the subband near-end indicator; wherein the subband masking weight is indicative of a masking of the echo of the far-end signal by the near-end signal in the subband;

determine a subband echo path filter coefficient based on a correlation between the transmit signal and the far-end signal in the subband; wherein the estimate of the level of the echo of the far-end signal in the subband corresponds to a level of the far-end signal in the subband multiplied by the subband echo path filter coefficient;

determine a subband attenuation for the transmit signal in the subband based on an estimate of a level of the echo of the far-end signal in the subband and based on the subband masking weight, by weighting the subband echo path filter coefficient with the subband masking weight; and attenuate the subband of the transmit signal by subtracting the level of the far-end signal in the subband multiplied by the subband attenuation from a level of the transmit signal in the subband.

2. The echo suppression circuit of claim 1, wherein the circuit is configured to determine a plurality of subband far-end indicators based on a corresponding plurality of subbands of the far-end signal;

determine a plurality of subband near-end indicators based on a corresponding plurality of subbands of the far-end signal and based on a corresponding plurality of subbands of the transmit signal;

determine a plurality of subband masking weights, based on the plurality of subband far-end indicators and based on the plurality of subband near-end indicators;

determine a plurality of subband attenuations for the transmit signal in the plurality of subbands based on an estimate of a level of the echo of the plurality of subbands of the far-end signal and based on the plurality of subband masking weights;

attenuate the plurality of subbands of the transmit signal using the corresponding plurality of determined subband attenuations.

3. The echo suppression circuit of claim 2, wherein the circuit comprises a Time-to-Frequency Transform unit configured to determine a plurality of frequency components of the far-end signal and of the transmit signal; and a Frequency-to-Subband unit configured to determine a reduced plurality of subbands of the far-end signal and of the transmit signal from the plurality of frequency components of the far-end signal and of the transmit signal, respectively.

4. The echo suppression circuit of claim 3, wherein the circuit is configured to determine a plurality of attenuations for the plurality of frequency components of the transmit signal by interpolating the plurality of subband attenuations.

5. The echo suppression circuit of claim 3, wherein the circuit is configured to determine an echo suppressed transmit signal from the plurality of attenuated subbands of the transmit signal.

6. The echo suppression circuit of claim 1, wherein the subband masking weight is determined based on a ratio of the subband far-end indicator and the subband near-end indicator.

7. The echo suppression circuit of claim 6, wherein the subband masking weight is further determined based on a correction factor adapted to tune an influence of the masking of the echo of the far-end signal by the near-end signal on the subband attenuation.

8. The echo suppression circuit (202) of claim 1, wherein the determined subband attenuation is time-variant and/or frequency-variant.

9. The echo suppression circuit of claim 1, wherein the subband masking weight is determined such that the attenuation applied to the subband of the transmit signal increases, if the masking of the echo of the far-end signal by the near-end signal in the subband decreases and vice versa.

10. An electronic device comprising
a loudspeaker adapted to render a far-end signal received at the electronic device;
a microphone adapted to capture a transmit signal; wherein the transmit signal comprises an echo of the rendered far-end signal and a near-end signal;
an echo suppression circuit of claim 1, adapted to attenuate a subband of a signal derived from the transmit signal, thereby yielding an echo suppressed transient signal; and
a transmission unit configured to transmit an echo suppressed transmit signal to a sender of the far-end signal.

11. The electronic device of claim 10, further comprising an echo cancellation unit adapted to
determine an estimate of the echo of the rendered far-end signal, based on the received far-end signal; and
subtract the estimate of the echo of the rendered far-end signal from the transmit signal, thereby yielding the signal derived from the transmit signal.

12. A method for attenuating a subband of a transmit signal; the method comprising:
providing a loudspeaker for rendering a receive signal received from a corresponding device at a far-end of a communication network and a microphone for capturing a transmit signal which is to be transmitted to the corresponding device at the far-end of the communication network;
capturing the transmit signal using the microphone; wherein the transmit signal comprises an echo of a far-end signal rendered by a loudspeaker and a near-end signal;
determining a subband far-end indicator of a voice activity in the far-end signal based on the far-end signal in the subband;
determining a subband near-end indicator of a voice activity of the near-end signal based on the far-end signal and based on the transmit signal in the subband;
determining a subband masking weight, based on the subband far-end indicator and based on the subband near-end indicator; wherein the subband masking weight is indicative of a masking of the echo of the far-end signal by the near-end signal in the subband;
determining a subband echo path filter coefficient based on a correlation between the transmit signal and the far-end signal in the subband; wherein the estimate of the level of the echo of the far-end signal in the subband corresponds to a level of the far-end signal in the subband multiplied by the subband echo path filter coefficient;
determining a subband attenuation for the transmit signal in the subband based on an estimate of a level of the echo of the far-end signal in the subband and based on the subband masking weight, by weighting the subband echo path filter coefficient with the subband masking weight; and
attenuating the subband of the transmit signal by subtracting the level of the far-end signal in the subband multiplied by the subband attenuation from a level of the transmit signal in the subband.

13. The method of claim 12, wherein an amount of the subband attenuation is proportional to a content of the far-end signal.

14. The method of claim 12, wherein the subband masking weight is determined such that the attenuation applied to the subband of the transmit signal increases, if the masking of the echo of the far-end signal by the near-end signal in the subband decreases and/or such that the attenuation applied to the subband of the transmit signal decreases, if the masking of the echo of the far-end signal by the near-end signal in the subband increases.

15. The method of claim 12, wherein the subband far-end indicator corresponds to or comprises a speech likelihood of the far-end signal.

16. The method of claim 12, wherein the subband near-end indicator corresponds to or comprises an estimate of a level of a voice signal comprised within the near-end signal.

17. The method of claim 12, wherein the subband near-end indicator corresponds to or comprises a speech likelihood of the near-end signal.

18. The method of claim 12, wherein the subband masking weight is determined based on a ratio of the subband far-end indicator and the subband near-end indicator.

19. The method of claim 12, wherein the subband masking weight is determined based on a correction factor adapted to tune an influence of the masking of the echo of the far-end signal by the near-end signal on the subband attenuation.

20. The method of claim 12, wherein the estimate of the level of the echo of the far-end signal in the subband corresponds to a level of the far-end signal in the subband multiplied by a subband echo path filter coefficient, wherein the subband echo path filter coefficient is determined based on a correlation between the transmit signal and the far-end signal in the subband.

21. The method of claim 12, wherein a plurality of subbands of the transmit signal or subbands of a signal derived from the transmit signal is attenuated.

22. The method of claim 21, wherein a plurality of subband masking weights and a plurality of subband attenuations is determined for attenuating the plurality of different subbands of the transmit signal.

23. The method of claim 21, wherein a plurality of subband far-end indicators is determined based on a corresponding plurality of subbands of the far-end signal.

24. The method of claim 21, wherein a plurality of subband near-end indicators are determined based on a corresponding plurality of subbands of the far-end signal and based on a corresponding plurality of subbands of the transmit signal.

25. The method of claim 21, wherein a plurality of subband masking weights is determined based on a plurality of subband far-end indicators and based on a plurality of subband near-end indicators.

26. The method of claim 21, wherein a plurality of frequency components of the far-end signal and of the transmit signal, respectively is determined by a Time-to-Frequency Transform unit.

27. The method of claim 26, wherein the Time-to-Frequency Transform unit uses a Fast Fourier Transform.

28. The method of claim 21, wherein a reduced plurality of subbands of the far-end signal and of the transmit signal is determined from the plurality of frequency components of the far-end signal and of the transmit signal, respectively by a Frequency-to-Subband unit.

29. The method of claim 21, wherein a plurality of frequency components is combined to a subband, in order to reduce computational complexity.

\* \* \* \* \*